United States Patent [19]

Hatanaka et al.

[11] Patent Number: 4,829,485

[45] Date of Patent: May 9, 1989

[54] METHOD OF READING SIGNALS IN A CHARGE-STORAGE LINE SENSOR IN WHICH EACH STORAGE DEVICE IS SEQUENTIALLY READ AND THEN RESET DURING A SUBSEQUENT DEAD TIME INTERVAL

[75] Inventors: Katsunori Hatanaka, Yokohama; Naoto Abe, Atsugi; Eiji Sakamoto; Toshihiro Saika, both of Hiratsuka, all of Japan

[73] Assignee: Canon Kabushiki Kaisha, Tokyo, Japan

[21] Appl. No.: 68,929

[22] Filed: Jul. 1, 1987

[30] Foreign Application Priority Data

Jul. 4, 1986 [JP] Japan ................................ 61-156262

[51] Int. Cl.⁴ .......................... G11C 8/00; G11C 7/00; G11C 13/04
[52] U.S. Cl. ................................... 365/239; 365/112; 365/189.07; 365/233; 365/184.12
[58] Field of Search ............... 365/110, 111, 189, 112, 365/149, 203, 230, 239, 240

[56] References Cited

U.S. PATENT DOCUMENTS

| | | | |
|---|---|---|---|
| 3,390,273 | 6/1968 | Weckler | 365/112 |
| 3,474,417 | 10/1969 | Kazan | 365/112 |
| 3,851,313 | 11/1974 | Chang | 365/239 |
| 3,991,408 | 11/1976 | Holmes, Jr. et al. | 365/239 |
| 4,193,095 | 3/1980 | Mizusuma | 365/111 |
| 4,322,635 | 3/1982 | Redwine | 365/240 |
| 4,394,749 | 7/1983 | Tsukada et al. | 365/112 |
| 4,485,461 | 11/1984 | Kobayashi | 365/239 |
| 4,677,594 | 1/1987 | Bisotto et al. | 365/240 X |

*Primary Examiner*—Stuart N. Hecker
*Assistant Examiner*—Alfonso Garcia
*Attorney, Agent, or Firm*—Fitzpatrick, Cella, Harper & Scinto

[57] ABSTRACT

A method of reading signals from a plurality of charge-storage devices in a charge-storage line sensor circuit so as to cause a switching device respectively corresponding to the plurality of charge-storage devices to sequentially read the stored signals and to sequentially reset the storage devices during a line read period. Dead time intervals are provided in the line read period between successive device read periods. A resetting operation for each storage device is performed in a dead time interval after the read operation for that storage device is completed.

10 Claims, 7 Drawing Sheets

METHOD OF READING SIGNALS IN A CHARGE-STORAGE LINE SENSOR IN WHICH EACH STORAGE DEVICE IS SEQUENTIALLY READ AND THEN RESET DURING A SUBSEQUENT DEAD TIME INTERVAL

BACKGROUND OF THE INVENTION

1. Field of the Invention

The present invention relates to a method of reading a signal in a charge-storage line sensor and, more particularly, to a method of reading a signal wherein switching means respectively corresponding to a plurality of charge-storage means sequentially read out external signals stored after preresetting and resetting operations are sequentially performed during signal read operations.

2. Related Background Art

A conventional method of driving a charge-storage line sensor used in a facsimile system, an image scanner, or the like is used in the following manner.

Figure 1:
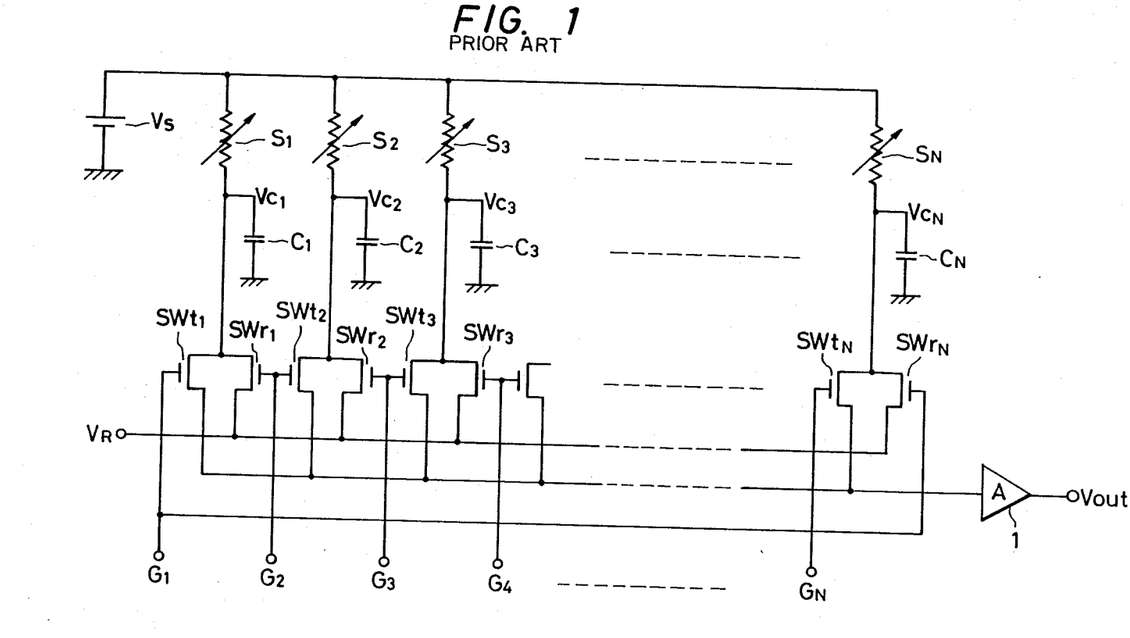
FIG. 1 is an equivalent circuit diagram of a conventional charge-storage line sensor.

FIG. 1 is an equivalent circuit diagram of a conventional charge-storage line sensor.

Figure 2:
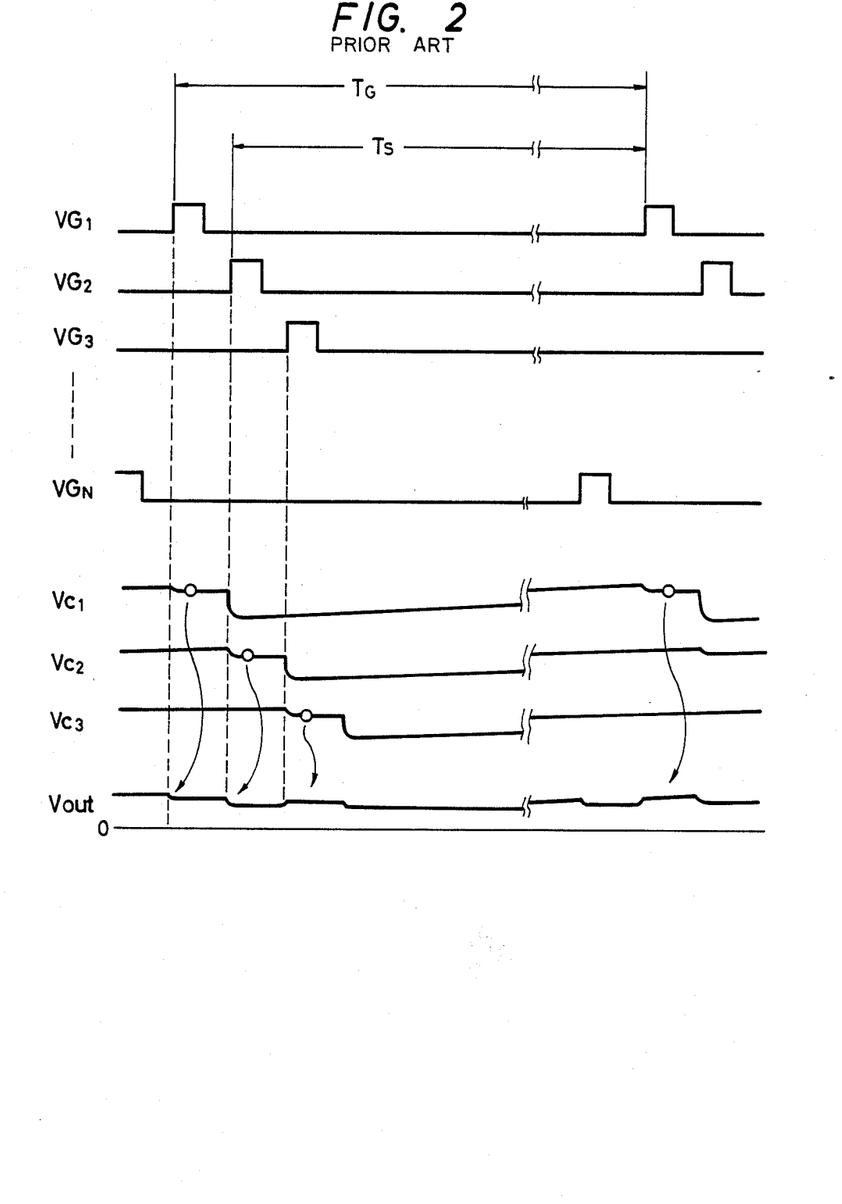
FIG. 2 is a timing chart for explaining the operation of the equivalent circuit shown in FIG. 1.

FIG. 2 is a timing chart for explaining the operation of the equivalent circuit.

Referring to FIG. 1, the first terminals of photosensors S1, S2, ... SN are commonly connected to a bias power source for applying a constant bias voltage Vs thereto, and the second terminals thereof are respectively connected to capacitors C1, C2, ... CN and drain electrodes of transfer switches SWt1, SWt2, ... SWtN comprising field effect transistors and drain electrodes of discharge switches SWr1, SWr2, ... SWrN comprising field effect transistors. The gate electrodes of the transfer switches SWt1, SWt2, ... SWtN are respectively connected to driving lines G1, G2, ... GN. The gate electrodes of the discharge switches SWr1, SWr2, ... SWrN−1, SWrN are respectively connected to the driving lines G2, G3, ... GN, G1. The source electrodes of the transfer switches SWt1, SWt2, ... SWtN are commonly connected to a buffer amplifier 1. The source electrodes of the discharge switches SWr1, SWr2, ... SWrN are commonly connected to a bias line VR for applying a bias voltage thereto.

Photocurrents from the photosensors S1, S2, ... SN are respectively stored in the capacitors C1, C2, ... CN, and the stored optical outputs (i.e., voltages Vc1, Vc2, ... VcN) sequentially enable the transfer switches SWt1, SWt2, ... SWtN and are transferred to the buffer amplifier 1. The discharge switches SWr1, SWr2, ... SWrN are turned on to reset (discharge) the voltages through the bias line VR.

The operation of the conventional charge-storage line sensor will be described with reference to FIG. 2.

Gate selection pulses (VG1, VG2, ... VGN) are respectively applied to the driving lines G1, G2, ... GN.

When the driving line G1 is selected and the gate selection pulse VG1 is applied thereto, the transfer switch SWt1 is turned on to output the optical output stored in the capacitor C1 to an output terminal Vout through the buffer amplifier 1.

Subsequently, the driving line G2 is selected, and the gate selection pulse VG2 is applied thereto. In this state, the transfer switch SWt2 is turned on to output the optical output stored in the capacitor C2 to the output terminal Vout through the buffer amplifier 1. At this time, the discharge switch SWr1 is also selected, and the discharge switch SWr1 is accordingly turned on. The optical output stored in the capacitor C1 is reset. The capacitors C1, C2, ... CN store voltages Vc1, Vc2, ... VcN, respectively. As shown in FIG. 2, the capacitor C1 stores the photocurrent of the photosensor S1 for a storage time Ts between the resetting timing set in response to the gate selection pulse VG2 and the read timing set in response to the next gate selection pulse VG1. In the same operation as described above, the optical outputs from the capacitors C1, C2, ... CN repeatedly appear at the output terminal Vout.

In the conventional charge-storage line sensor described above, the voltages Vc1, Vc2, ... VcN of the optical outputs stored in the capacitors C1, C2, ... CN for the storage time Ts shown in FIG. 2 are represented as follows when the light incident resistances of the photosensors S1, S2, ... SN are respectively given as Rs1, Rs2, ... RsN, and the capacitance of the capacitors C1, C2, ... CN are respectively given as Y1, Y2, ..., YN:

$$VcX = Vs1 - \{\exp(-Ts/Rsx \cdot Yx)\} \text{ for } x=1, 2, \ldots N \qquad (1)$$

The voltages Vc1, Vc2, ... VcN are set to Vs/2 when a reference white original is read. When the reference white original is to be read, the resistance RsX of the photosensor and the capacitance Yx in equation (1) satisfy relation $Rsx \cdot Yx \approx 1.44 Ts$.

Since the voltages Vc1, Vc2, ... VcN influence characteristics such as an S/N ratio, dynamic range, and linearity of the detection signal, they must be stabilized. It is, however, very difficult to maintain the constant products of the photosensor resistances Rs1, Rs2, ... RsN and the capacitor capacitances Y1, Y2, ... YN in units of lots due to variations in the fabrication process.

In order to maintain constant values in units of lots, the following correction operations are performed:

(1) An amount of light source is controlled;
(2) A bias voltage of the photosensor is regulated; and
(3) The storage time Ts is controlled.

However, item (1), i.e., correction of the amount of light, greatly influences optical response characteristics, optical degradation, and service life of the photosensors, thus resulting in disadvantages in product reliability. Item (2) i.e., regulation of the bias voltage Vs of the photosensors, cannot essentially contribute to correction of the product Rsx·Yx. In addition, a great change in bias voltage Vs degrades linearity of the detection signal. Item (3), i.e., control of the storage time Ts, is the most preferable control method. However, the storage time Ts depends on the line read period TG, as shown in FIG. 2. The line read period TG is determined by ratings of a system (e.g., a facsimile system or an image scanner incorporating the line sensor. Therefore, the storage time Ts cannot be simply changed. As a result, the storage time Ts cannot be changed either.

Another scheme for controlling the storage time Ts is to modify the circuit arrangement shown in FIG. 1. More specifically, the driving lines connected to the gate electrodes of the transfer switches SWt1, SWt2, ... SWtN are connected separately from the driving lines connected to the discharge switches SWr1, SWr2, ... SWrN to offset the discharge timings, thereby varying the storage time. According to this scheme, however, the number of driving lines is increased to 2N, and the connecting steps for the gate drive circuit are doubled, thus resulting in high cost.

The above description exemplifies the photoconductive line sensor. However, the above problems can also apply to a photodiode type line sensor. In particular, in the photodiode type line sensor, when a storage capacitor is constituted by opposite electrodes of the photodiode and a semiconductor layer sandwiched therebetween, a change in thickness of the semiconductor layer directly causes a change in photocurrent and capacitance. Therefore, it is more difficult to control variations in characteristics between the lots.

SUMMARY OF THE INVENTION

It is a principal object of the present invention to provide a method of reading a signal in a charge-storage sensor, which eliminates the conventional problems described above.

It is another object of the present invention to provide a method of reading a signal in a charge-storage sensor, wherein a storage time can be changed without changing a line read period and without increasing the number of driving lines for switches.

It is still another object of the present invention to provide a method of a reading a signal in a charge-storage line sensor so as to cause switching means respectively corresponding to a plurality of charge-storage means sequentially to read external signals stored after presetting and to sequentially perform resetting operations during the read operations, wherein a dead time interval is provided in the read period of the charge-storage means, and the resetting operation is performed in a desired portion of the dead time interval after the read operation is completed.

DETAILED DESCRIPTION OF THE PREFERRED EMBODIMENTS

A preferred embodiment of the present invention will be described in detail with reference to the accompanying drawings. A method of reading a signal exemplifies a case wherein a signal is read out from a charge-storage line sensor.

The term "dead time operation" is defined as an operation in which switching means is turned on to reset the charge-storage means connected thereto, but no signal is read out from the charge-storage means.

Figure 3:
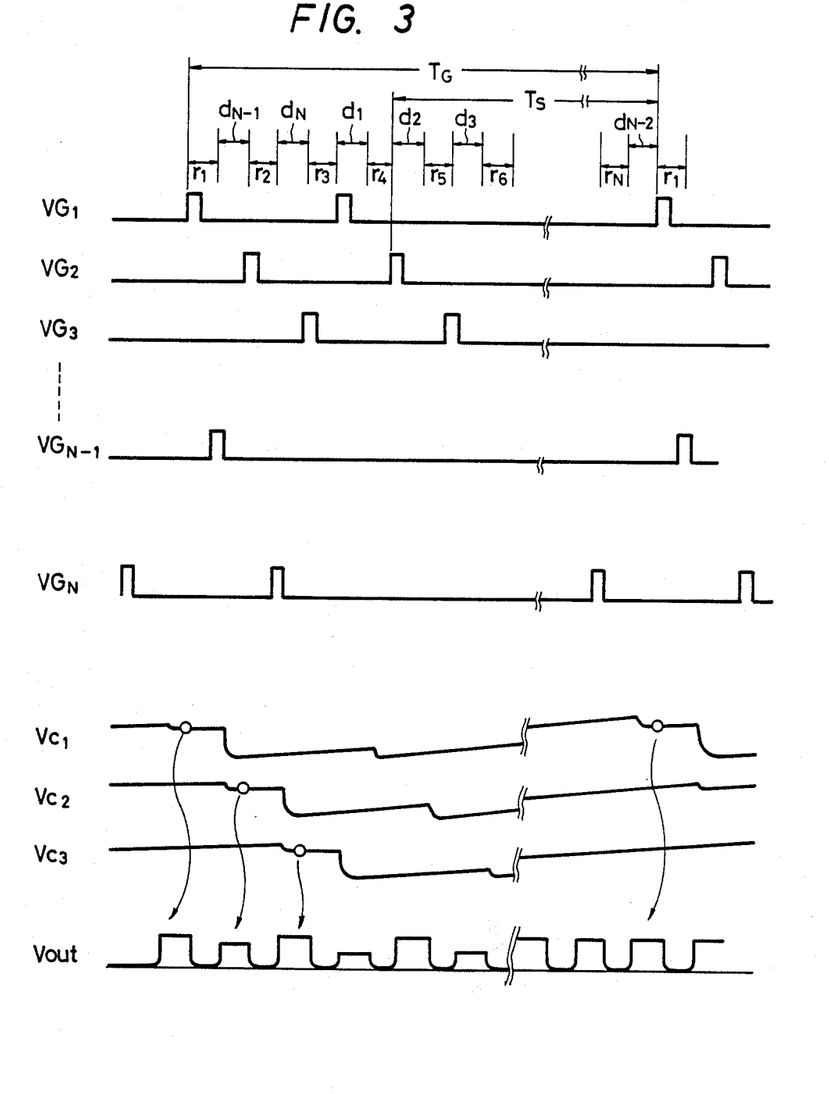
FIG. 3 is a timing chart for explaining a method of reading a signal in a charge-storage line sensor according to an embodiment of the present invention.

FIG. 3 is a timing chart for explaining a method of reading a signal from a charge-storage line sensor according to the present invention.

The arrangement of the charge-storage line sensor according to the present invention is the same as the equivalent circuit diagram in FIG. 1, and a detailed description thereof will be omitted.

Referring to FIG. 3, a line read period TG is divided into 2N time intervals. Odd-numbered time intervals are assigned as read time intervals r1, r2, ... rN, and even-numbered time intervals are assigned as dead time intervals d1, d2, ... dN. The read and dead time intervals alternately appear, and driving lines G1, G2, ... GN are sequentially and exclusively selected, and a driving voltage is applied thereto.

The read time interval for selecting the first driving line G1 is defined as R1, the dead time interval for selecting the first driving line G1 is defined as d1, and the read and dead time intervals selected in an order of the driving lines G2, G3, ... Gn are respectively defined as r2, r3, ... rN and d2, d3, ... dN.

The operation according to the method of reading the signal according to the present invention will be described below.

When a gate selection pulse VG1 is applied to the driving line G1 within the read time interval r1, a transfer switch SWt1 is turned on to read out an optical output stored in a capacitor C1.

When a gate selection pulse VG2 is applied to the driving line G2 within the read time interval r2, a transfer switch SWt2 is turned on to read out an optical output stored in a capacitor C2. At the same time, a discharge switch SWr1 is turned on to reset the optical output stored in the capacitor C1. Similarly, when a gate selection pulse VG3 is applied to the driving line G3 within the read time interval r3, and optical output stored in a capacitor C3 is read out. At the same time, the optical output stored in the capacitor C2 is reset.

When the gate selection pulse VG2 is applied to the driving line G2 within the dead time interval d2, the capacitor C1 is reset again. In this case, the optical output stored in the capacitor C2 is read out again, but this signal is ignore, since C2 has already been read.

The optical output stored in the capacitor C1 is read out again in the dead time interval d1. In this case, the signal output is also ignore, since C1 has already been read during time interval r1.

After the capacitor C1 is reset again, storage of the photocurrent is initiated by a photosensor S1. Storage continues until the gate selection pulse VG1 in the next read time interval r1 is applied to the driving line G2. More specifically, according to the method of reading the signal according to the present invention, storage time Ts is defined as a duration from an application of the gate selection pulse VG2 within the dead time interval d2 to the application of the gate selection pulse VG1 within the read time interval r1.

Similarly, the read, resetting, dead time, repeated resetting, storage operations of the capacitors C2, C3, ... CN are performed, thereby reading the signals.

According to the method of reading the signal of the present invention, the gate selection pulses applied to the driving lines are applied to desired durations of the dead time intervals, and time differences between the read time intervals ri (i=1, 2, ... N) and the dead time intervals di (i=1, 2, ... N), i.e., the storage times Ts, can be arbitrarily changed.

A driving circuit for alternately switching between the read and dead time intervals, maintaining the storage time constant, sequentially selecting the driving lines, and applying the gate selection pulses thereto can be easily realized as a digital circuit.

Figure 4:
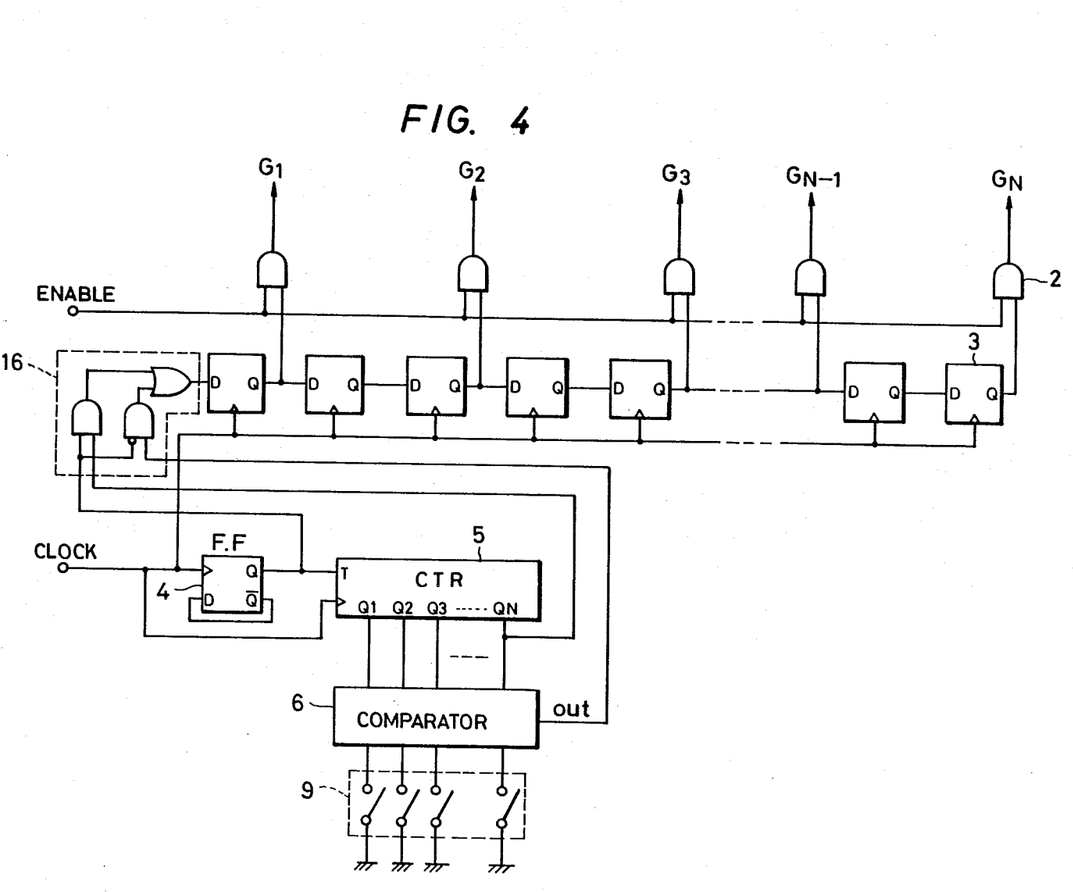
FIG. 4 is a circuit diagram showing a driving circuit using a shift register.

FIG. 4 is a circuit diagram showing a driving circuit using a shift register.

Referring to FIG. 4, gate driving output lines are connected to every other ones of 2N−1 shift registers 3. The gate driving output lines are connected to first input terminals of enable gates 2, respectively. The outputs of the enable gates 2 are respectively connected to the driving lines G1, G2, . . . GN. The gate driving output lines are connected to every other shift registers so as to provide the dead time intervals d1, d2, . . . dN.

The serial inputs of the shift registers 3 are connected to the output of a gate circuit 16. The clock inputs of the shift registers 3 are commonly connected to a clock signal line.

The gate circuit 16 receives an output from a D flip-flop 4 and an N count output QN from a counter (CTR) 5 and generates a read pulse every period TG. The gate circuit 16 receives the output from the D flip-flop 4 and an output from a comparator 6 and generates a dead time pulse every period TG which is delayed by a predetermined period of time from the read pulse. The read and dead time pulses are selectively input to the serial inputs of the shift registers 3. The read and dead time pulses are sequentially shifted by the shift register 3 and are supplied as the gate selection pulses VG1, VG2, . . . VGN to the driving lines G1, G2, . . . GN. The pulse width of each of the gate selection pulses VG1, VG2, . . . VGN is controlled in response to a signal pulse supplied from the enable terminal.

The counter 5 receives output pulses from the D flip-flop 4 and generates the N count output QN every period TG. The counter 5 also supplies the count output to the comparator 6. When the count output coincides with a data output set by a storage time setting switch 9, the comparator 6 outputs a dead time control pulse to the gate circuit 16.

Figure 5:
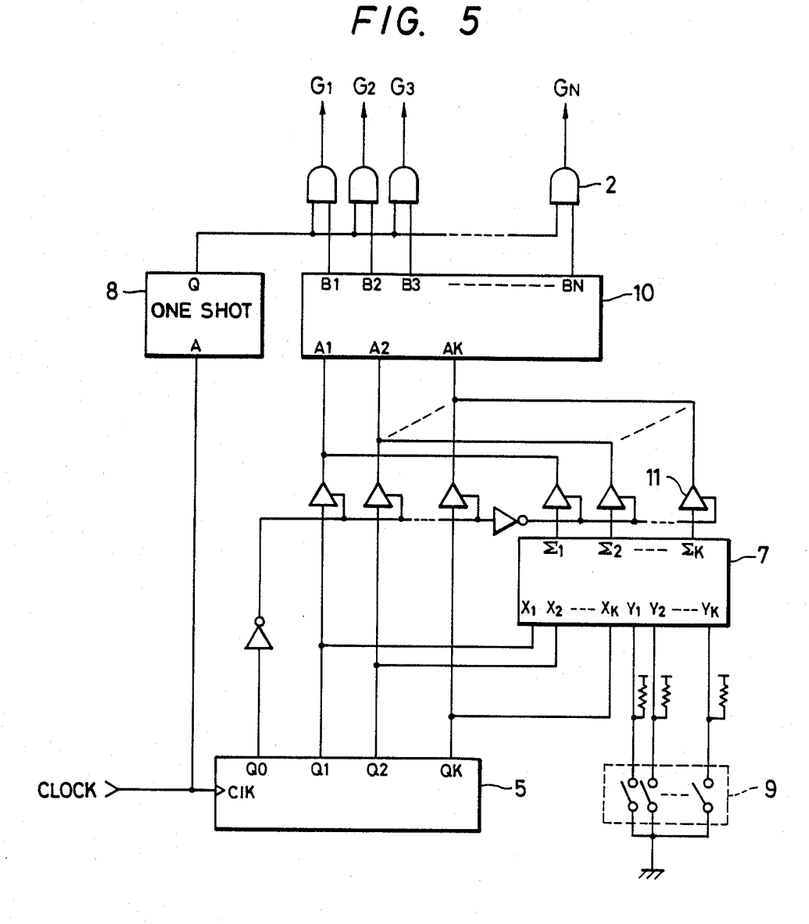
FIG. 5 is a circuit diagram showing another driving circuit.

FIG. 5 is a circuit diagram showing another driving circuit.

Referring to FIG. 5, the driving lines G1, G2, . . . GN are respectively connected to the outputs of enable gates 2. The first input terminals of the enable gates 2 are commonly connected to the output of a one-shot circuit (i.e., a monostable multivibrator) 8. Whenever the one-shot circuit 8 receives the clock signal, it generates a pulse having a predetermined pulse width. The pulse signal controls the pulse widths of gate selection pulses VG1, VG2, . . . VGN respectively applied to the driving lines G1, G2, . . . GN.

The second input terminals of the enable gates 2 are respectively connected to the outputs of a decoder 10. The inputs of the decoder 10 are connected to a counter 5 and an adder 7 through corresponding tristate (high, low, and floating levels) circuits 11. The output from the counter 5 and the output from the adder 7 are alternately selected in response to a ½ frequency-divided output from the Q0 output of the counter 5. The selected output is input to the decoder 10.

The adder 7 adds the output from the counter 5 and an output from a storage time setting switch 9 and supplies a control signal to the decoder 10 during the desired dead time interval determined by the storage time setting switch 9.

In the above arrangements of the driving circuits, the storage time is set by the storage time setting switch as a switch with contacts. However, a reference white original reader or the like may be arranged to automatically control such that the output from the reader is kept constant.

Another embodiment of the charge-storage line sensor using the method of reading the signal of the present invention will be described below.

Figure 6:
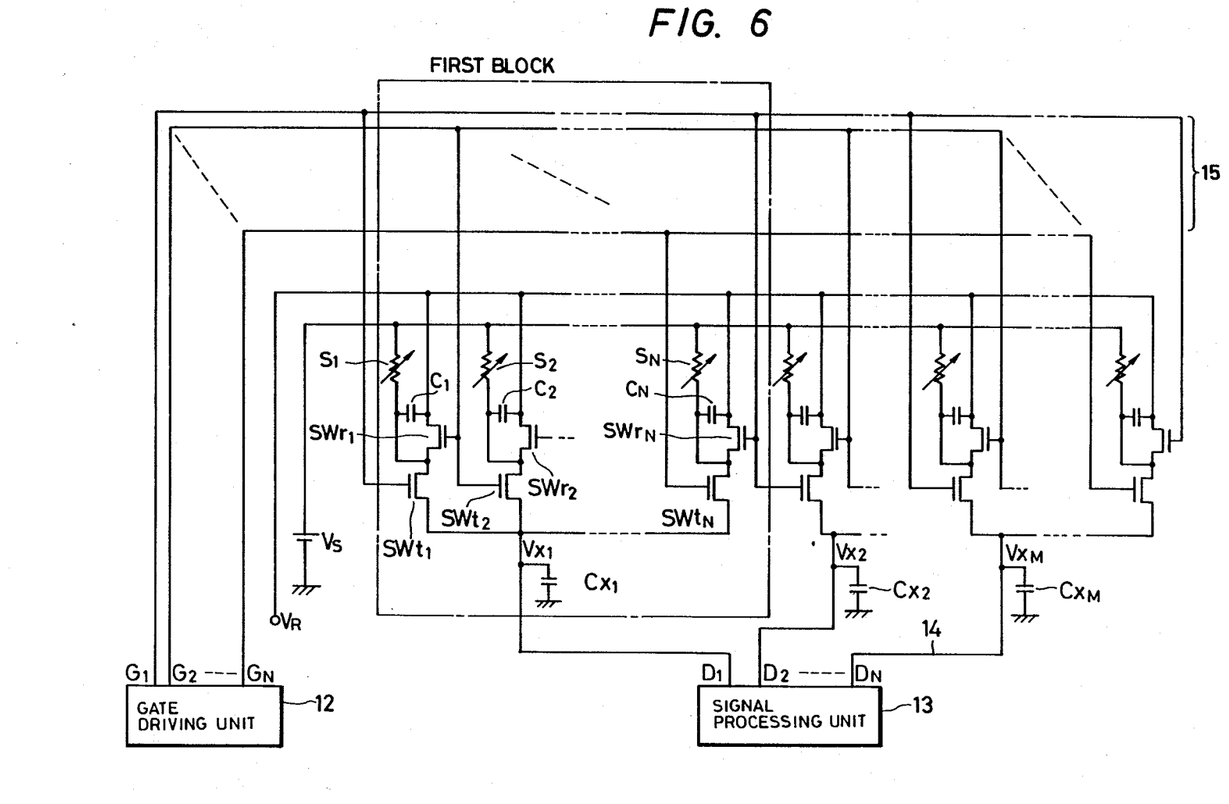
FIG. 6 is an equivalent circuit diagram of a matrix-connected charge-storage line sensor according to another embodiment of the present invention.

FIG. 6 is an equivalent circuit diagram of a matrix-connected charge-storage line sensor. The same reference numerals as in FIG. 1 denote the same parts in FIG. 6, and a detailed description thereof will be omitted.

In this embodiment, photosensors S1, S2, . . . SN, capacitors C1, C2, . . . CN, transfer switches SWt1, SWt2, . . . SWtN, and discharge switches SWr1, SWr2, . . . SWrN are arranged in arrays to constitute one of M blocks. In other words, the charge-storage line sensor comprises M blocks each consisting of N photosensors, N capacitors, N transistor switches, and N discharge switches. The gate electrodes of the transfer switches SWt1, SWt2, . . . SWtN and the discharge switches SWr1, SWr2, . . . SWrN in the first block are connected to matrix wiring 15. The gate electrodes of the transfer switches SWt1, SWt2, . . . SWtN are respectively connected to the gate electrodes of the corresponding transfer switches of other blocks. The gate electrodes of the switches SWr1, SWr2, . . . SWrN are respectively connected to the gate electrodes of the next transfer switches of other blocks.

The common lines (gate driving lines G1, G2, . . . GN) of the matrix wring 15 are driven by a gate driving unit 12.

The charges stored by the capacitors C1, C2, . . . CN are transferred to a common storage capacitor Cx1 by the transfer switches SWt1, SWt2, . . . SWtN. Similarly, the charges stored by the capacitors C1, C2, . . . CN of the respective groups are transferred to storage capacitors Cx2, Cx3, . . . CxM, respectively. The storage capacitors Cx1, Cx2, . . . CxM are connected to a signal processing unit 13 through corresponding lines 14 (i.e., signal output lines D1, D2, . . . DM).

The signal processing unit 13 includes an analog switch, a shift register, and a buffer amplifier and converts M parallel signals into a serial signal.

The gate driving unit 12 comprises the circuit shown in FIGS. 2 or 3.

Figure 7:
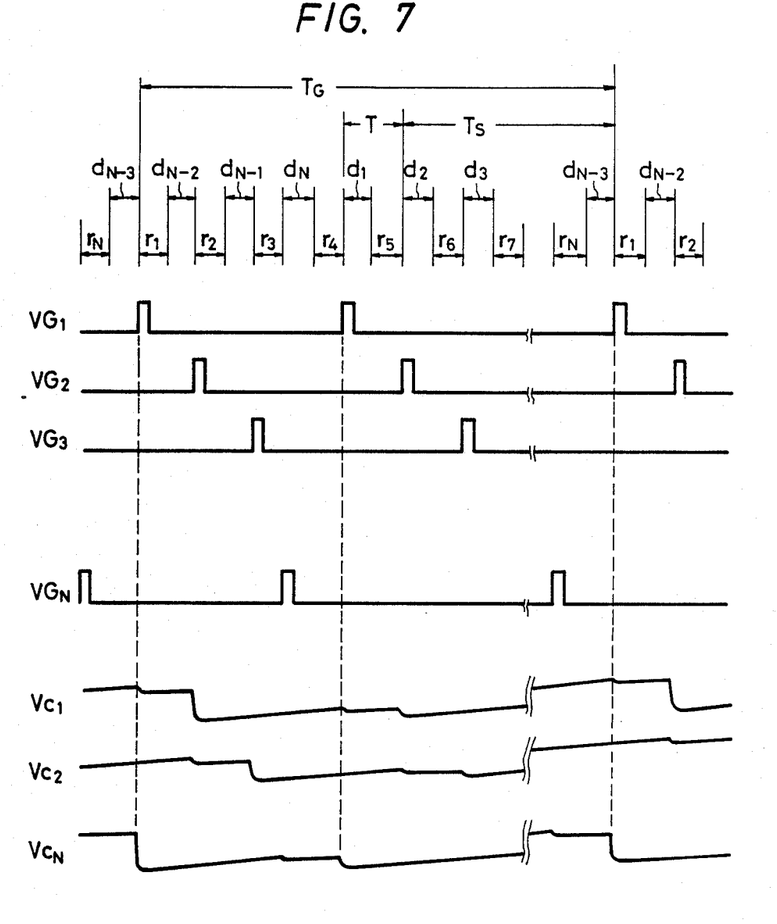
FIG. 7 is a timing chart for explaining a method of reading a signal from the charge-storage line sensor shown in FIG. 6.

FIG. 7 is a timing chart for explaining a method of reading a signal from the charge-storage line sensor shown in FIG. 6.

The operation for reading the signal from the charge-storage line sensor is the same as that in FIG. 3, and a detailed description thereof will be omitted.

As shown in FIG. 7, in the embodiment of FIG. 6, a dead time interval d2 is provided next to a read time interval r5. The storage time is shorter than the storage time Ts (FIG. 3) by a time T obtained by adding the read and dead time intervals.

In the above embodiment, the matrix wiring is formed on the side of the gate electrodes. The gate electrodes of the transfer switches are commonly connected to the gate electrodes of the discharge switches in each block, and the source electrodes of the corresponding transfer switches of the respective blocks are commonly connected. In this manner, the matrix wiring may be located on the side of the source electrodes.

In the above embodiment, the outputs from the capacitors C1, C2, . . . CN are read in the form of voltage, and the voltages are reset by other discharge switches. However, the outputs may be read as current signals. In this case, the charges stored in the capacitors are converted into currents at the time of read operations. The read and discharge operations are simultaneously performed, thus eliminating the discharge switches.

According to the method of reading the signal of the above embodiment, the storage time can be changed without changing the read period. The amount of charge stored in the charge storage means can be arbitrarily controlled.

The method of reading the signal of the above embodiment can be suitably used in a line sensor apparatus or the like, and variations in sensor resistance and the storage capacitance between the lots can be corrected. As a result, product yields can be improved, and a detection signal for good reproducibility can be obtained. The number of driving lines is not increased, and a compact, low-cost sensor apparatus can be provided. In addition, correction for degradation of sensor characteristics can also be performed to improve initial characteristics of the line sensor and prolong service life thereof.

When a light source is arranged in the line sensor apparatus, variations in light sources between the lots, deterioration of the light sources, and the like can be corrected according to storage time control.

We claim:

1. A method of reading signals from a plurality of charge-storage devices in a charge-storage line sensor apparatus so as to cause switching means respectively corresponding to the plurality of charge-storage devices to sequentially read the stored signals and to sequentially reset the storage devices during a line read period, wherein dead time intervals are provided in the line read period between successive device read periods, and wherein a resetting operation for each storage device is performed in a dead time interval after the read operation for that storage device is completed.

2. A method according to claim 1, wherein said charge storage devices respectively correspond to a plurality of sensor elements.

3. A method of reading and resetting a plurality of charge storage devices, comprising the steps of:
    reading a first storage device during a first read period;
    providing a first dead time interval subsequent to said first read period;
    reading a second storage device during a second read period subsequent to said first dead time interval;
    providing a second dead time interval subsequent to said second read period; and
    resetting said first storage device during said second dead time interval.

4. A method according to claim 3, wherein said step of reading the second storage device includes the step of preliminary resetting said first storage device.

5. A method of reading and resetting a plurality of charge-storage devices, comprising the steps of:
    reading a first storage device during a first read period;
    providing a first dead time interval subsequent to said first read period;
    reading a second storage device during a second read period subsequent to said dead time interval;
    providing a second dead time interval subsequent to said second read period;
    reading a third storage device during a third read period subsequent to said second dead time interval;
    providing a third dead time interval subsequent to said third read period;
    reading a fourth storage device during a fourth read period subsequent to said third dead time interval;
    providing a fourth dead time interval subsequent to said fourth read period; and
    resetting said first storage device during said fourth dead time interval.

6. A method according to claim 5, wherein said step of reading the second storage device includes the step perliminarily resetting said first storage device.

7. A method according to claim 5, wherein said step of reading the first storage device includes the step of providing a first read pulse during the first read period.

8. A method according to claim 7, wherein said step of providing the third dead time interval includes the step of applying the first read pulse again.

9. A method according to claim 8, wherein said step of reading the second storage device includes the step of providing a second read pulse.

10. A method according to claim 9, wherein said step of resetting said first storage device during said fourth dead time interval includes the step of applying said second read pulse again.

* * * * *

UNITED STATES PATENT AND TRADEMARK OFFICE
CERTIFICATE OF CORRECTION

PATENT NO. : 4,829,485

DATED : May 9, 1989

INVENTOR(S) : Katsunori Hatanaka, et al.

It is certified that error appears in the above-identified patent and that said Letters Patent is hereby corrected as shown below:   Title page:

AT [56] References Cited:

Change "4,193,095  3/1980  Mizusuma" to read --4,193,095  3/1980  Mizushima--.

COLUMN 2:

Line 18, change "capacitance" to --capacitances--.

Line 55, change "sensor." to --sensor).--

COLUMN 4:

Line 12, change "R1," to --r1,--.

Line 15, change "Gn" to --GN--.

Line 31, change "and" to --an--.

Lines 38 and 41, change "ignore," to --ignored,--

UNITED STATES PATENT AND TRADEMARK OFFICE
CERTIFICATE OF CORRECTION

PATENT NO. : 4,829,485

DATED : May 9, 1989

INVENTOR(S) : Katsunori Hatanaka, et al.

It is certified that error appears in the above-identified patent and that said Letters Patent is hereby corrected as shown below:

<u>COLUMN 7</u>:

Lines 39 and 42, change "charge storage devices" to --charge-storage devices,--.

<u>COLUMN 8</u>:

Line 9, change "preliminary" to --preliminarily--.

Line 33, change "perliminarily" to --preliminarily--.

Signed and Sealed this

Seventeenth Day of April, 1990

Attest:

HARRY F. MANBECK, JR.

*Attesting Officer*   *Commissioner of Patents and Trademarks*